(12) United States Patent
Conlon

(10) Patent No.: US 11,375,077 B1
(45) Date of Patent: Jun. 28, 2022

(54) DECONTAMINATION OF MULTI-FUNCTION DEVICE CLUSTERS IN RESPONSE TO DETECTED USE

(71) Applicant: Xerox Corporation, Norwalk, CT (US)

(72) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/131,431

(22) Filed: Dec. 22, 2020

(51) Int. Cl.
*H04N 1/00* (2006.01)

(52) U.S. Cl.
CPC ..... *H04N 1/00909* (2013.01); *H04N 1/00244* (2013.01); *H04N 1/00408* (2013.01); *H04N 1/00925* (2013.01); *H04N 1/00976* (2013.01); *H04N 2201/0094* (2013.01)

(58) Field of Classification Search
CPC ........... H04N 1/00909; H04N 1/00244; H04N 1/00408; H04N 1/00925; H04N 1/00976; H04N 2201/0094; G21F 9/001; G21F 9/002
See application file for complete search history.

(56) References Cited

U.S. PATENT DOCUMENTS

| 10,299,101 | B1* | 5/2019 | Lim | G08B 7/066 |
| 2005/0237178 | A1* | 10/2005 | Stomski | E04H 9/06 340/521 |
| 2016/0341672 | A1* | 11/2016 | Clark | G01N 21/8803 |
| 2020/0380701 | A1* | 12/2020 | Bui | G06Q 20/34 |
| 2021/0073430 | A1* | 3/2021 | Levy | G06N 5/025 |

* cited by examiner

*Primary Examiner* — Juan M Guillermety

(57) ABSTRACT

A method is disclosed. For example, the method executed by a processor of a multi-function device (MFD) includes detecting use of the MFD, wherein the MFD is associated with a plurality of MFDs that are designated as a cluster within a location, deactivating the MFD in response to use of the MFD being detected, transmitting a first notification to deactivate the plurality of MFDs within the cluster in response to use of the MFD being detected, initiating a decontamination process within the location in response to the use of the MFD being detected, receiving an indication that the decontamination process is completed, transmitting a second notification to reactivate the plurality of MFDs within the cluster, and reactivating the MFD.

20 Claims, 5 Drawing Sheets

DECONTAMINATION OF MULTI-FUNCTION DEVICE CLUSTERS IN RESPONSE TO DETECTED USE

The present disclosure relates generally to multi-function devices (MFDs), and relates more particularly to controlling MFDs in clusters.

BACKGROUND

Multi-function devices (MFDs) are used to process print jobs. An MFD can perform a variety of different functions including printing, scanning, copying, faxing, and the like.

An enterprise or a company may have various policies related to use of different equipment including MFDs. The policies may be instituted for a variety of different reasons. For example, the policies may be instituted for health reasons, for cost savings, for production efficiency, and the like.

In some instances, the policies may monitor how MFDs are being used and nearby devices by the MFD. Certain health policies may deter the use of other MFDs in a location when one MFD is used. This may be due to the fact that some pathogens may stay airborne after an individual enters a location to an MFD.

SUMMARY

According to aspects illustrated herein, there are provided a method and a non-transitory computer readable medium for controlling MFD clusters. One disclosed feature of the embodiments is a method, executed by a processor of the MFD, that comprises detecting use of the MFD, wherein the MFD is associated with a plurality of MFDs that are designated as a cluster within a location, deactivating the MFD in response to use of the MFD being detected, transmitting a first notification to deactivate the plurality of MFDs within the cluster in response to use of the MFD being detected, initiating a decontamination process within the location in response to the use of the MFD being detected, receiving an indication that the decontamination process is completed, transmitting a second notification to reactivate the plurality of MFDs within the cluster, and reactivating the MFD.

Another disclosed feature of the embodiments is a non-transitory computer-readable medium having stored thereon a plurality of instructions, the plurality of instructions including instructions which, when executed by a processor, cause the processor to perform operations to detect use of the MFD, wherein the MFD is associated with a plurality of MFDs that are designated as a cluster within a location, deactivate the MFD in response to use of the MFD being detected, transmit a first notification to deactivate the plurality of MFDs within the cluster in response to use of the MFD being detected, initiate a decontamination process within the location in response to the use of the MFD being detected, receive an indication that the decontamination process is completed, transmit a second notification to reactivate the plurality of MFDs within the cluster, and reactivate the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to control MFD clusters. As discussed above, an enterprise or a company may have various policies related to use of different equipment including MFDs. The policies may be instituted for a variety of different reasons. For example, the policies may be instituted for health reasons, for cost savings, for production efficiency, regulatory compliance, with tracking and reporting to agencies if desired, and the like.

In some instances, the policies may monitor how MFDs are being used and nearby devices by the MFD. Certain health policies may deter the use of other MFDs in a location when one MFD is used. This may be due to the fact that some pathogens may stay airborne for a period of time after an individual enters a location to an MFD.

As a result, some companies want to prevent users from using nearby MFDs after an MFD is used within a location to prevent other users from getting sick. Currently, when a user approaches an MFD, the user does not know who had previously used the MFD, how long another user was at the MFD, when another user was at the MFD, and the like.

One embodiment of the present disclosure organizes MFDs into a clusters within a particular location. The cluster of MFDs may be controlled based on the user of anyone of the MFDs within the cluster. For example, when one MFD within a cluster is used, a decontamination process may be triggered to prevent use of other MFDs within the cluster at the location. When the decontamination process is completed, other users may be allowed to use the MFDs within the cluster of MFDs at a particular location.

In one embodiment, the decontamination process may be an active process, a passive process, or a combination of processes applied in a tiered approach. For example, an active process may be to activate a ventilation system to cycle the air within and around the cluster of MFDs at the location. An example of a passive process may include a countdown timer to allow the air to cycle naturally through the location. In one embodiment, the tiered approach may apply a passive process when the previous use is below a time threshold and may be apply an active process when the previous is above the time threshold.

In one embodiment, when MFDs within a cluster are undergoing a decontamination process, the MFDs may transmit a notification. The notification may be sent to endpoint devices of users. The notification may indicate which MFDs are deactivated while undergoing the decontamination process and/or provide a map with routes to available MFD clusters that are nearby the user. Thus, controlling the MFDs via clusters of MFDs may prevent users from possibly getting sick when nearby MFDs within the cluster of MFDs are used.

Figure 1:
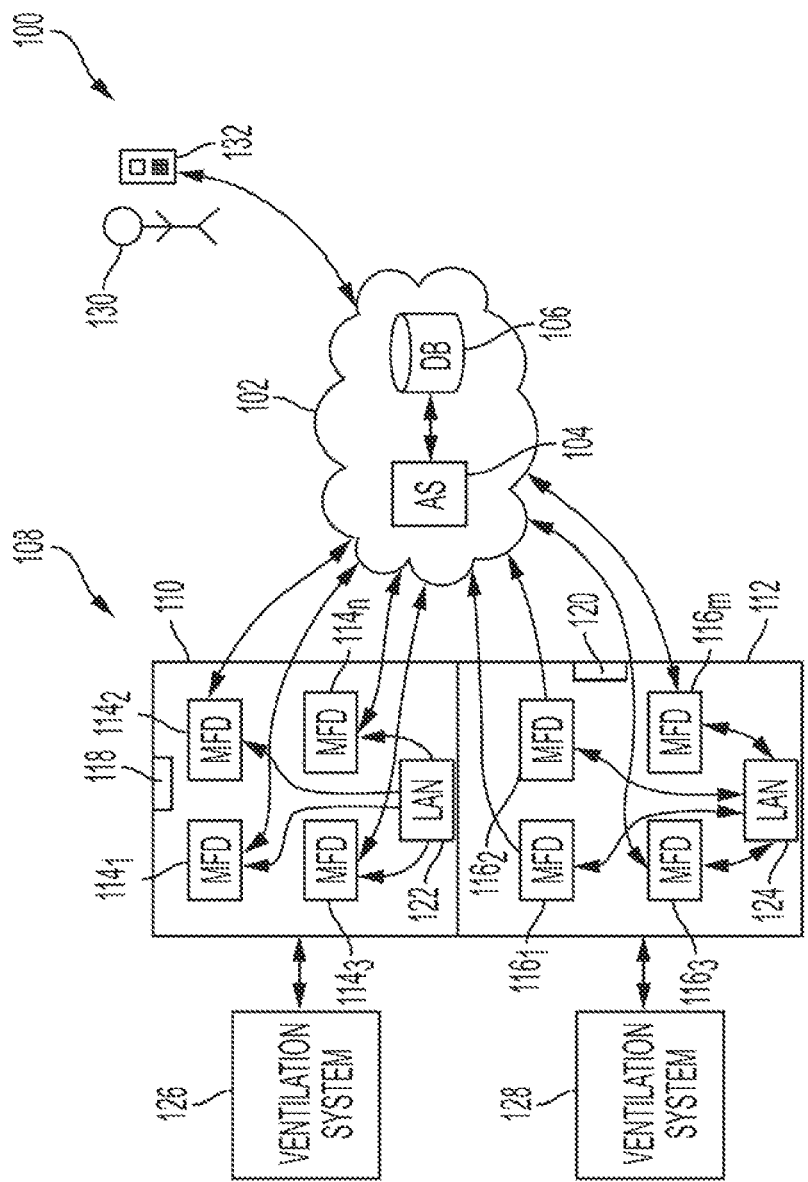
FIG. 1 illustrates a block diagram of an example network with clustered MFDs of the present disclosure.

FIG. 1 illustrates an example network 100 of the present disclosure. In one embodiment, the network 100 may include an internet protocol (IP) network 102. In one embodiment, the IP network 102 may include an application server (AS) 104 and a database (DB) 106. Although a single AS 104 and single DB 106 is illustrated in FIG. 1, it should be noted that any number of application servers and databases may be deployed in the IP network 102. The AS 104 and the DB 106 may be operated by a service provider that manages the operation and maintenance of MFDs deployed at different locations and/or different customer sites.

It should be noted that the IP network 102 has been simplified for ease of explanation. For example, the IP network 102 may include additional network components that are not shown. For example, the IP network 102 may include additional access networks, a gateway, a firewall, various network elements, and the like.

In one embodiment, the AS 104 may be communicatively coupled to multi-function devices (MFDs) $114_1$-$114_n$ (hereinafter also referred to individually as an MFD 114 or collectively as MFDs 114) and MFDs $116_1$-$116_m$ (hereinafter also referred to individually as an MFD 116 or collectively as MFDs 116). In one embodiment, the MFDs 114 and 116 may be deployed within a building 108. The building 108 may be an office building with several floors and/or different rooms on each floor.

Although FIG. 1 illustrates an example with the AS 104, it should be noted that the MFDs 114 and 116 may be deployed using any type of network topology. For example, the MFDs 114 and 116 may clone files across a fleet and have an internal database. The MFDs 114 and 116 may know about each MFD in a cluster without the AS 104.

In one embodiment, the MFDs 114 may be organized into a cluster 110 and the MFDs 116 may be organized into a cluster 112. The sizes of the clusters 110 and 112 and the numbers of MFDs 114 and 116 within the clusters 110 and 112 may vary. In one embodiment, the clusters 110 and 112 may be defined by zones that are covered by respective ventilation systems 126 and 128. In one embodiment, the clusters 110 and 112 may be defined by a department, a room, by floor, and the like. Although two clusters 110 and 112 are illustrated in FIG. 1, it should be noted that any number of clusters of MFDs may be deployed.

In one embodiment, the clusters 110 and 112 may be organized such that the MFDs 114 and 116 are activated and deactivated together within their respective clusters 110 and 112. For example, if the MFD $114_1$ in the cluster 110 is deactivated, then all of the MFDs 114 in the cluster 110 may be deactivated. Similarly, when the MFD $114_1$ is reactivated, then all of the MFDs 114 in the cluster 110 may also be reactivated.

In some embodiments, the clusters 110 and 112 may be physically divided by rooms. The rooms may include respective doors 118 and 120 to enter. The doors 118 and 120 may have locks that may be remotely engaged and disengaged to control when users may enter the room based on whether the MFDs 114 and/or 116 are deactivated or activated, as discussed in further details below.

In one embodiment, the MFDs 114 in the cluster 110 and the MFDs 116 in the cluster 112 may be controlled by the AS 104. The AS 104 may serve as a centralized controller of the MFDs 114 and 116. The AS 104 may activate and deactivate the MFDs 114 and 116 based on detected usage of one of the MFDs 114 or 116, as discussed in further details below.

In one embodiment, the MFDs 114 may communicate directly with each other via a local area network (LAN) 122. The MFDs 116 may also communicate directly with each other via a LAN 124. The LANs 122 and 124 may be local WiFi networks or routers that communicatively couple the MFDs 114 or 116 to exchange notifications directly with one another.

In one embodiment, both the AS 104 and the LANs 122 and 124 may be deployed. For example, the LANs 122 and 124 may serve as a back-up to control the MFDs 114 and 116 locally if communication to the AS 104 is disrupted or disconnected.

In one embodiment, the network 100 may also include an endpoint device 132 of a user 130. The endpoint device 132 may be a smart phone, a tablet computer, a laptop computer, a desktop computer, or any other type of electronic device that can receive messages from the MFDs 114 and 116 and/or the AS 104.

As briefly noted above, the MFDs 114 and 116 may be controlled as clusters 110 and 112, respectively, based on detected use of any of the MFDs 114 in the cluster 110 or any of the MFDs 116 in the cluster 112. In one embodiment, if use of any of the MFDs 114 or 116 is detected, then a decontamination process may be initiated. The decontamination process may be to ensure that no germs and/or contaminants remain at the location of the clusters 110 and/or 112 after one of the MFDs 114 or 116 is used.

In one embodiment, the decontamination process may be an active process or a passive process. For example, the active process may activate systems and/or devices to initiate a decontamination process. In one embodiment, the active process may include activating the ventilation system 126 or 128 that is associated with the cluster 110 or 112, respectively. For example, if use of an MFD 114 in the cluster 110 is detected, then the MFDs 114 may be deactivated and the ventilation system 126 may be activated to cycle the air at the location associated with cluster 110. After the ventilation system 126 completes a cycle, the MFDs 114 may be reactivated.

In one embodiment, an amount of time that the ventilation system 126 or 128 is activated may be based on an amount of time that the MFD 114 or 116 was used. For example, the longer the amount of time that the MFD 114 or 116 was used, the longer the ventilation system 126 or 128 may be activated to cycle the air at the location.

In one embodiment, tying the operation of the ventilation systems 126 and 128 to the detected uses of the MFDs 114 and 116 may also help to save energy costs. For example, periodically activating the ventilation systems 126 and 128 throughout the day, even when no one enters the locations of the clusters 110 and 112, may waste energy costs to operate the ventilation systems 126 and 128. In contrast, controlling the ventilation systems 126 and 128 in response to detected uses of the MFDs 114 and 116 may provide a more targeted approach to operating the ventilation systems 126 and 128, thereby reducing usage and energy costs.

In one embodiment, the active process may also include preventing users from entering the locations of the clusters 110 and 112 when use of the MFDs 114 and 116 is detected. For example, locks on the doors 118 and 120 may be engaged when use of one of the MFDs 114 or 116 is detected.

To illustrate, the cluster 112 may be in a room that has a door 120. Use of the MFD 116 may be detected to trigger a decontamination process and deactivate the MFDs 116 in the cluster 112. To prevent users from entering the room, a control signal may be sent to the lock on the door 120 to engage the lock until the ventilation system 128 completes an air cycle in the room. The control signal may be sent from the MFD 116 or from the AS 104 in response to a detection signal sent from the MFD 116 to the AS 104. After the cycle is complete, a control signal may be sent to the lock on the door 120 to disengage the lock and reactivate the MFDs 116.

In one embodiment, the passive process may include allowing an amount of time to elapse to naturally let the air at the locations of the clusters 110 and 112 cycle out of the room. For example, the MFDs 114 and 116 may include a countdown timer that is activated after a use is detected. The MFDs 114 and 116 may be deactivated when use is detected and may be reactivated after the countdown timer has expired.

In one embodiment, the countdown timer may be dynamically changed or set based on an amount of time the MFDs 114 or 116 were used. For example, if an MFD 114 was used for a short period of time (e.g., less than one minute), then the countdown timer may be set to a relatively short amount of time (e.g., 5 minutes). However, if the MFD 114 was used for a long period of time (e.g., greater than one minute), then the countdown timer may be set to a longer amount of time (e.g., 30 minutes).

In one embodiment, a tiered approach for the decontamination process may be applied that includes both active processes and passive processes. For example, the decontamination process that is activated may be based upon the amount of time that the MFD 114 or 116 was used. For example, the tiered approach may include a time threshold (e.g., 5 minutes). If the amount of use of the MFD 114 or 116 is less than the time threshold, then a passive process may be activated (e.g., the countdown timer). If the amount of time that the MFD 114 or 116 was used is greater than the time threshold, then the active process may be activated (e.g., activating the ventilation system 126 or 128 and/or engaging the locks on the doors 118 or 120, and so forth).

As noted above, the control of the MFDs 114 and 116 and the decontamination process may be performed locally by the MFDs 114 and 116 via the LANs 122 and 124, or may be controlled remotely via the AS 104. For example, the AS 104 may monitor the clusters 110 and 112. In an example, use of the MFD $114_1$ may be detected. In response, the MFD $114_1$ may send a first notification to the AS 104 that use was detected. In response, the AS 104 may send a control signal to the MFDs $114_1$ to $114_n$ to deactivate the MFDs $114_1$ to $114_n$. The AS 104 may then initiate any one of the decontamination processes described above.

In another example, use of the MFD $114_1$ may be detected. In response, the MFD $114_1$ may send a first notification to the other MFDs $114_2$ to $114_n$ directly via the LAN 122. The MFD $114_1$ may then initiate any one of the decontamination processes described above. For example, the MFD $114_1$ may send a control signal to the ventilation system 126 to cycle the air. In another example, the MFD $114_1$ may send a countdown timer activation signal to the MFDs $114_2$ to $114_n$ within the cluster 110 such that the countdown timers of the MFDs $114_1$ to $114_n$ are synchronized.

In one embodiment, a message may be generated to transmit to the endpoint device 132 of the user 130. In one embodiment, the message may be transmitted to the most frequent users of the MFDs in a cluster that is being decontaminated. The list of most frequent users may be stored by the DB 106. In another example, the MFDs in a cluster may be associated with a particular department. The message may be transmitted to those users in the department associated with a cluster of MFDs that is being decontaminated.

Figure 3:
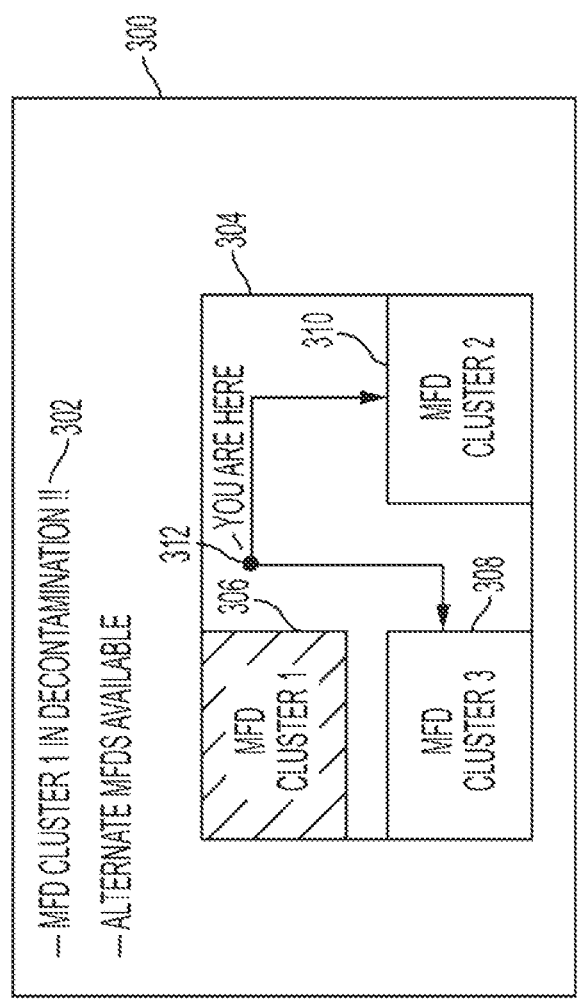
FIG. 3 illustrates an example notification of the present disclosure.

FIG. 3 illustrates an example of a message 300 that may be transmitted to the endpoint device 132. In one embodiment, the message 300 may include an alert 302 that includes an identification of the MFD that is in decontamination.

In one embodiment, the message 300 may also include alternate MFDs that are available. For example, a map 304 may be included in the message 300 that detects the location of the endpoint device 132 and illustrates a route to nearby MFD clusters. For example, in the map 304, block 306 illustrates that MFD cluster 1 is in decontamination and unavailable through a greyed out block or other visual indication. The map 304 shows a marker 312 that represents the current location of the endpoint device 132. The map 304 also shows routes to a block 308 that represents an MFD cluster 3 and a block 310 that represents an MFD cluster 2. As a result, the user 130 may easily reroute to an available MFD rather than going to the MFD cluster 1 to find out that the MFDs are unavailable due to the decontamination process.

Figure 2:
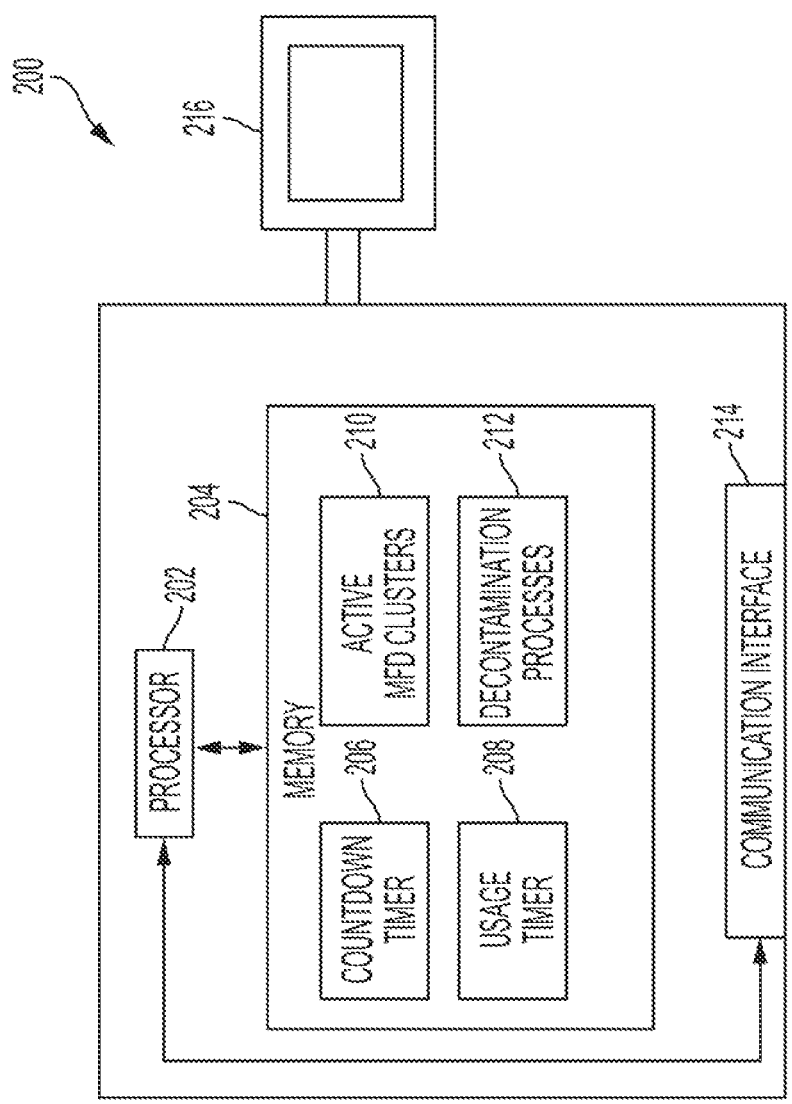
FIG. 2 illustrates a block diagram of an example MFD of the present disclosure.

FIG. 2 illustrates an example MFD 200 of the present disclosure. The MFD 200 may be either an MFD 114 or 116 illustrated in FIG. 1. It should be noted that the MFD 200 has been simplified for ease of explanation and may include additional components that are not shown. For example, the MFD 200 may include paper trays, printheads, toner cartridges, an optical scanner, a digital front end, transport paths, finishing modules, and the like.

In one embodiment, the MFD 200 may include a processor 202, a memory 204, a communication interface 214, and a display 216. The processor 202 may be communicatively coupled to the memory 204, the communication interface 214, and the display 216. The processor 202 may execute instructions stored in the memory 204 to perform the functions described herein. The processor 202 may control operation of the communication interface 214 and the display 216.

In one embodiment, the memory 204 may be any type of non-transitory computer readable medium. For example, the memory 204 may be a random access memory (RAM), a read-only memory (ROM), a hard disk drive, a solid state drive, and the like.

In one embodiment, the memory 204 may include a countdown timer 206, a usage timer 208, a list of active MFD clusters 210, and decontamination processes 212. In one embodiment, the countdown timer 206 may include a clock that can count down to zero when activated, as described above. The countdown timer 206 may be dynamically set to different time values based on the decontamination processes 212 that are executed, as described above. Although a countdown timer 206 is described, it should be noted that the countdown timer 206 may also be deployed as a clock that tracks an amount of time until a threshold is exceeded.

In one embodiment, the countdown timer 206 may be reset by any activity detected on any MFD 200 within a cluster. For example, a first MFD may be halfway through the countdown timer 206. However, a second MFD within the same cluster as the first MFD may be inadvertently used. As a result, the countdown timer 206 may be reset for all the MFDs within the cluster.

In one embodiment, the usage timer 208 may track an amount of time for which the MFD 200 is used. In one embodiment, the usage timer 208 may begin tracking an amount of time when a user logs into the MFD 200 and stop when the user logs out of the MFD 200. In one embodiment, the usage timer 208 may begin tracking an amount of time when a job request is received and stop when no activity is detected for a predetermined amount of time (e.g., 30 seconds, 1 minute, and the like) or when the MFD 200 enters a power save mode.

In one embodiment, the active MFD clusters 210 may track a list of MFD clusters that are active and are undergoing a decontamination process. The active MFD clusters 210 may be accessed by the MFD 200 to provide a list of MFDs that are available if the MFD 200 is deactivated to undergo a decontamination process. For example, the available MFD clusters may be shown in the message 300 illustrated in FIG. 3 and described above. The active MFD clusters 210 may be updated via messages from the AS 104 or from other MFDs 200 via local communication protocol (e.g., the LAN 122 or LAN 124, peer-to-peer communications, multicast domain name system (mDNS) protocols, and the like).

In one embodiment, the decontamination processes 212 may include instructions that are executed by the processor 202 to perform any one of the decontamination processes described above. For example, the decontamination processes 212 may include protocols to communicate directly with the ventilation system 126 or 128 if controlled locally by the MFD 200. The decontamination processes 212 may include the timer threshold for the usage amounts if a tiered decontamination process is applied. In one embodiment, the decontamination processes 212 may also include thresholds for the countdown timer 206 when the countdown timer 206 is dynamically set based on the usage time, as described above. In one embodiment, the decontamination processes may also include instructions to generate and transmit the message 300 to the endpoint device 132 of a user 130, as described above.

In one embodiment, the communication interface 214 may be a wired or wireless communication interface. The communication interface 214 may also include an interface to communicate via a local network or a remote network. For example, the communication interface 214 may be a WiFi radio, a Bluetooth radio, an Ethernet port, and the like. The processor 202 may transmit and receive notifications to/from the AS 104 or other MFDs 200 (or MFDs 114 and 116 illustrated in FIG. 1), transmit and receive control signals, and the like via the communication interface 214.

In one embodiment, the display 216 may provide a graphical user interface (GUI). The display 216 may be a touch screen interface or may include physical buttons (not shown) to navigate menus and options shown on the display 216. In one embodiment, the display 216 may also display the message 300 locally to notify any users that the MFD 200 is deactivated until the decontamination process is completed.

Thus, the MFDs may be modified to operate in clusters in response to a detected use of one of the MFDs in the cluster. The MFDs may be controlled locally by other MFDs or may be controlled via a remotely located application server that monitors all of the cluster of MFDs. When use of an MFD in a cluster is detected, all of the MFDs in the cluster may be deactivated and a decontamination process may be activated. The cluster of MFDs may be reactivated when the decontamination process is completed.

Figure 4:
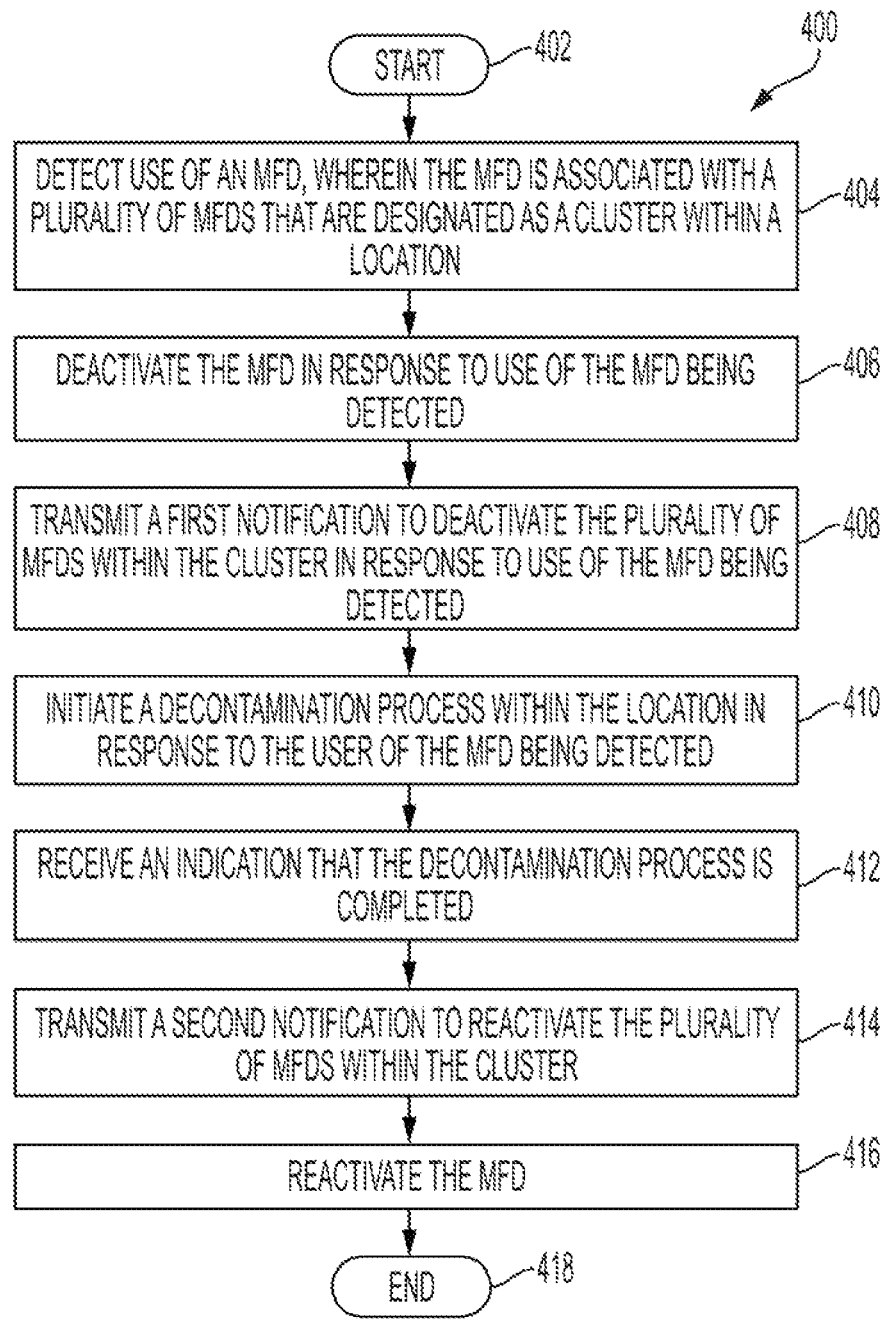
FIG. 4 illustrates a flow chart of a method for controlling MFD clusters of the present disclosure.

FIG. 4 illustrates a flow chart of an example method 400 for controlling MFD clusters of the present disclosure. In one embodiment, the method 400 may be performed by the MFD 102 or by an apparatus, such as the apparatus 500 illustrated in FIG. 5 and discussed below.

In one embodiment, the method 400 begins at block 402. At block 404, the method 400 detects use of an MFD, wherein the MFD is associated with a plurality of MFDs that are designated as a cluster within a location. For example, the MFDs may be organized into different clusters. The clusters may be defined based on a room, a floor, a location within a particular floor, an area associated with a particular department, and the like.

In one embodiment, when a user logs into the MFD or when a job request is received by the MFD, the MFD may detect use. In one embodiment, any type of activity on the MFD may be detected to detect use of the MFD without a user log-in. For example, the MFD may monitor paper tray open/close, paten door open/close, loading paper in a document feeder, and the like. In one embodiment, the MFD may begin tracking an amount of time that the MFD is being used.

At block 406, the method 400 deactivates the MFD in response to use of the MFD being detected. For example, MFD may locally deactivate itself once a user has completed use of the MFD. For example, after a user logs out, or after an activity timer has timed out (e.g., no activity detected for a 1 minute), the MFD may be deactivated.

At block 408, the method 400 transmits a first notification to deactivate the plurality of MFDs within the cluster in response to use of the MFD being detected. In one embodiment, the first notification may be transmitted directly to the other MFDs within the cluster, if the cluster of MFDs is controlled locally. In one embodiment, if the cluster of MFDs is controlled remotely by a server, the first notification may be transmitted to the server.

At block 410, the method 400 initiates a decontamination process within the location in response to the use of the MFD being detected. In one embodiment, the decontamination process may be a passive or an active process. For example, for the passive process, the decontamination process may include a countdown timer.

In one embodiment, the active process may include transmitting a control signal to a ventilation system at the location to cycle air through the location. The ventilation system may include a furnace or blower with duct work that can replace the air at the location with fresh air to remove whatever germs or airborne viruses may remain at the location.

The active process may also include transmitting a control signal to cause locks on doors that access the location to be engaged. As a result, users may be prevented from entering the location until the ventilation system completes a cycle.

In one embodiment, the decontamination process may include a tiered response that uses the amount of time for which the MFD is used and a time threshold. For example, when the amount of time for which the MFD is used is less than the time threshold, the countdown timer may be used for the decontamination process. However, when the amount of time the MFD is used is greater than the time threshold, the ventilation system of the location may be activated.

In one embodiment, the decontamination process may also generate a message. The message may indicate the plurality of MFDs in the cluster that are affected by the decontamination process and may provide a map to alternate MFDs that are available for use. The message may then be transmitted to endpoint devices of employees or users associated with the location. For example, the employees may be based on the employees that most frequently use the MFDs in the cluster or employees that are part of a department assigned to use the MFDs in the cluster, and so forth.

At block 412, the method 400 receives an indication that the decontamination process is completed. For example, when the countdown timer expires or the ventilation system completes a cycle, the MFD may receive an indication.

At block 414, the method 400 transmits a second notification to reactivate the plurality of MFDs within the cluster. In one embodiment, the second notification may be transmitted directly to the other MFDs within the cluster, if the cluster of MFDs is controlled locally. In one embodiment, if the cluster of MFDs is controlled remotely by a server, the second notification may be transmitted to the server.

At block 416, the method 400 reactivates the MFD. For example, when controlled locally, the MFD may reactivate itself and send a control signal to other MFDs within the cluster to reactivate. When controlled remotely, the server may send a control signal to reactivate the MFD and the other plurality of MFDs in the cluster in response to the second notification. At block 418, the method 400 ends.

Figure 5:
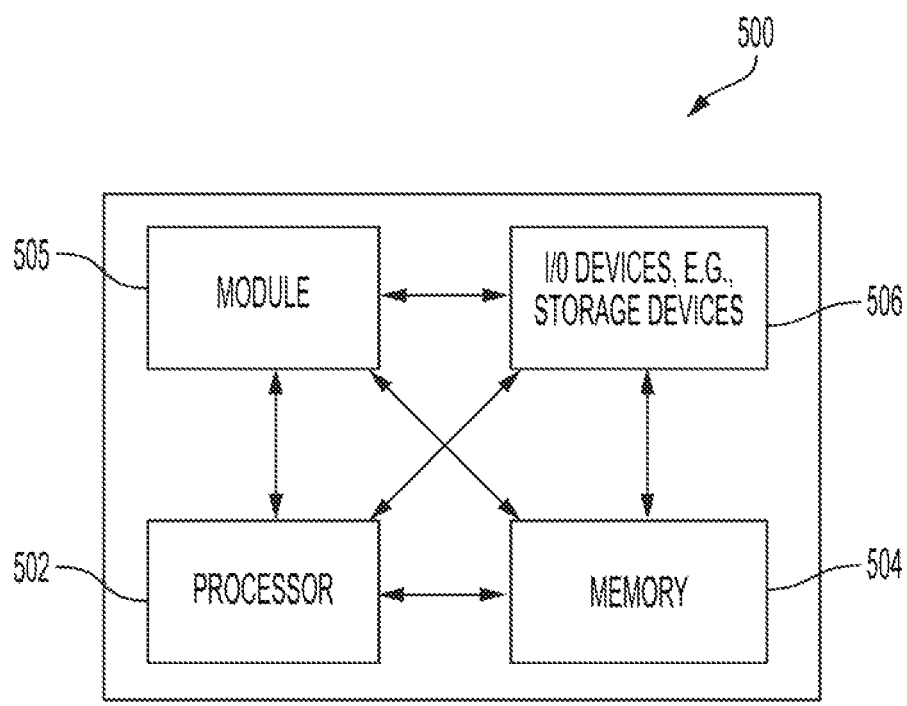
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for controlling MFD clusters, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 or controlling MFD clusters (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for controlling MFD clusters (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   detecting, by a processor of a multi-function device (MFD), use of the MFD, wherein the use of the MFD comprises any activity on the MFD by a user, wherein the MFD is associated with a plurality of MFDs that are designated as a cluster within a location;
   deactivating, by the processor, the MFD in response to the use of the MFD being detected;
   transmitting, by the processor, a first notification to deactivate the plurality of MFDs within the cluster in response to the use of the MFD being detected;
   initiating, by the processor, a decontamination process within the location in response to the use of the MFD being detected;
   receiving, by the processor, an indication that the decontamination process is completed;
   transmitting, by the processor, a second notification to reactivate the plurality of MFDs within the cluster; and
   reactivating, by the processor, the MFD.

2. The method of claim 1, wherein the decontamination process comprises:
   transmitting, by the processor, a control signal to a ventilation system at the location to cycle air through the location.

3. The method of claim 1, wherein the decontamination process comprises:
   activating, by the processor, a countdown timer on the MFD and the plurality of MFDs in the cluster.

4. The method of claim 1, wherein the decontamination process comprises:
   transmitting, by the processor, a control signal to cause locks on doors that access the location to be engaged.

5. The method of claim 1, wherein the decontamination process comprises:
   generating, by the processor, a message that indicates the plurality of MFDs in the cluster that is affected by the decontamination process and a map to alternate MFDs that are available for use; and
   transmitting, by the processor, the message to endpoint devices of employees associated with the location.

6. The method of claim 1, wherein the first notification and the second notification are transmitted to a server communicatively coupled to the MFD and the plurality of MFDs within the cluster, wherein the server is to control operation of the MFD and the plurality of MFDs within the cluster.

7. The method of claim 1, wherein the first notification and the second notification are transmitted directly from the MFD to each one of the plurality of MFDs within the cluster.

8. The method of claim 1, wherein the detecting use of the MFD comprises:
   activating, by the processor, a timer to determine an amount of time for which the MFD was used, wherein the decontamination process comprises a tiered response based on the amount of time for which the MFD was used.

9. The method of claim 8, wherein the tiered response comprises a countdown timer when the amount of time for which the MFD was used is less than a time threshold.

10. The method of claim 9, wherein the tiered response comprises activating a ventilation system of the location when the amount of time for which the MFD was used is greater than the time threshold.

11. A non-transitory computer-readable medium storing a plurality of instructions, which when executed by a processor of a multi-function device (MFD), causes the processor to perform operations comprising:
  detecting use of the MFD, wherein the use of the MFD comprises any activity on the MFD by a user, wherein the MFD is associated with a plurality of MFDs that are designated as a cluster within a location;
  deactivating the MFD in response to the use of the MFD being detected;
  transmitting a first notification to deactivate the plurality of MFDs within the cluster in response to the use of the MFD being detected;
  initiating a decontamination process within the location in response to the use of the MFD being detected;
  receiving an indication that the decontamination process is completed;
  transmitting a second notification to reactivate the plurality of MFDs within the cluster; and
  reactivating the MFD.

12. The non-transitory computer-readable medium of claim 11, wherein the decontamination process comprises:
  transmitting a control signal to a ventilation system at the location to cycle air through the location.

13. The non-transitory computer-readable medium of claim 11, wherein the decontamination process comprises:
  activating a countdown timer on the MFD and the plurality of MFDs in the cluster.

14. The non-transitory computer-readable medium of claim 11, wherein the decontamination process comprises:
  transmitting a control signal to cause locks on doors that access the location to be engaged.

15. The non-transitory computer-readable medium of claim 11, wherein the decontamination process comprises:
  generating a message that indicates the plurality of MFDs in the cluster that is affected by the decontamination process and a map to alternate MFDs that are available for use; and
  transmitting the message to endpoint devices of employees associated with the location.

16. The non-transitory computer-readable medium of claim 11, wherein the first notification and the second notification are transmitted to a server communicatively coupled to the MFD and the plurality of MFDs within the cluster, wherein the server is to control operation of the MFD and the plurality of MFDs within the cluster.

17. The non-transitory computer-readable medium of claim 11, wherein the first notification and the second notification are transmitted directly from the MFD to each one of the plurality of MFDs within the cluster.

18. The non-transitory computer-readable medium of claim 11, wherein the detecting use of the MFD comprises:
  activating a timer to determine an amount of time for which the MFD was used, wherein the decontamination process comprises a tiered response based on the amount of time for which the MFD was used.

19. The non-transitory computer-readable medium of claim 18, wherein the tiered response comprises a countdown timer when the amount of time for which the MFD was used is less than a time threshold and activating a ventilation system of the location when the amount of time for which the MFD was used is greater than the time threshold.

20. A method, comprising:
  detecting, by a processor of a multi-function device (MFD), use of the MFD, wherein the use of the MFD comprises any activity on the MFD by a user, wherein the MFD is associated with a plurality of MFDs that are designated as a cluster within a location;
  measuring, by the processor, an amount of time for which the MFD was used;
  deactivating, by the processor, the MFD in response to the use of the MFD being detected;
  transmitting, by the processor, a first notification to deactivate the plurality of MFDs within the cluster in response to the use of the MFD being detected;
  causing, by the processor, a ventilation system to be activated to cycle air in the location by an amount of time that is a function of the amount of time for which the MFD was used in response to the use of the MFD being detected;
  receiving, by the processor, an indication that the ventilation system has completed an air cycle in the location;
  transmitting, by the processor, a second notification to reactivate the plurality of MFDs within the cluster; and
  reactivating, by the processor, the MFD.

* * * * *